US011053088B2

(12) United States Patent
Ochiishi et al.

(10) Patent No.: US 11,053,088 B2
(45) Date of Patent: Jul. 6, 2021

(54) HAND, ROBOT SYSTEM, AND WORKPIECE EXTRACTION METHOD

(71) Applicant: Fanuc Corporation, Yamanashi (JP)

(72) Inventors: Yoshinori Ochiishi, Yamanashi (JP); Kenshou Ishimoto, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/699,804

(22) Filed: Dec. 2, 2019

(65) Prior Publication Data

US 2020/0180878 A1    Jun. 11, 2020

(30) Foreign Application Priority Data

Dec. 7, 2018    (JP) .............................. JP2018-230029

(51) Int. Cl.
*B65G 59/02* (2006.01)
*B25J 15/02* (2006.01)
*B65G 47/90* (2006.01)
*B65G 59/10* (2006.01)
*B25J 15/00* (2006.01)

(52) U.S. Cl.
CPC ........ *B65G 59/106* (2013.01); *B25J 15/0052* (2013.01); *B25J 15/02* (2013.01); *B65G 59/02* (2013.01); *B65G 59/10* (2013.01)

(58) Field of Classification Search
CPC ...... B65G 59/02; B65G 59/023; B65G 59/10; B65G 59/106; B65G 47/90; B65G 59/105; B65G 59/062; B65G 59/102; B25J 15/02; B25J 15/0052; B65B 35/16; B65B 35/36; B65H 3/24; B65H 2301/4223; B65H 2301/42242; B66F 9/183; B66F 9/18
See application file for complete search history.

(56) References Cited

U.S. PATENT DOCUMENTS 3,165,233 A * 1/1965 West ..................... B65G 59/101
                                                             221/221
3,283,955 A * 11/1966 Crabtree ................. B65B 43/44
                                                             221/251
(Continued)

FOREIGN PATENT DOCUMENTS

JP    H04-182231 A    6/1992
JP    11059895 A       3/1999
(Continued)

*Primary Examiner* — Gregory W Adams
(74) *Attorney, Agent, or Firm* — RatnerPrestia (57) ABSTRACT

A hand includes a plurality of first gripping members which move relative to each other, a first drive unit configured to move the plurality of first gripping members in a first opening and closing direction to bring the plurality of first gripping members close to each other or separate them from each other, a plurality of second gripping members which move relative to each other independently from the plurality of first gripping members, a second drive unit configured to move the plurality of second gripping members in a second opening and closing direction to bring the plurality of second gripping members close to each other or separate them from each other, and a third drive unit configured to move the plurality of first gripping members relative to the plurality of second gripping members in a third direction intersecting the first and second opening and closing directions.

10 Claims, 12 Drawing Sheets

(56) References Cited

U.S. PATENT DOCUMENTS

| | | | | |
|---|---|---|---|---|
| 3,866,883 | A | * | 2/1975 | Goransson ............. B65G 57/00 254/93 R |
| 4,696,501 | A | * | 9/1987 | Webb ..................... B25J 13/082 294/103.1 |
| 4,909,412 | A | * | 3/1990 | Cerf ..................... B65G 59/105 221/1 |
| 5,013,213 | A | * | 5/1991 | Roberts ................ B65G 59/106 198/409 |
| 5,088,783 | A | * | 2/1992 | Squires .................. B66C 1/447 294/207 |
| 5,791,867 | A | * | 8/1998 | Kuhl ..................... B65G 59/103 414/773 |
| 6,074,163 | A | * | 6/2000 | Yamazaki ............. B65G 49/06 414/795.5 |
| 6,099,239 | A | * | 8/2000 | Klipp .................... B65G 59/101 414/797.4 |
| 6,357,599 | B1 | * | 3/2002 | Morrison ............. B65G 59/106 209/509 |
| 6,846,153 | B2 | * | 1/2005 | Schiesser ............... B65G 59/08 414/795.6 |
| 7,021,887 | B2 | * | 4/2006 | Hoe ..................... B65G 59/105 414/796.5 |
| 7,556,470 | B2 | * | 7/2009 | Lawson ............. B29D 30/0016 157/1.17 |
| 7,887,108 | B1 | * | 2/2011 | Cawley ................ B25J 15/0266 294/2 |
| 8,172,292 | B1 | * | 5/2012 | Andersen ............... B65B 5/105 294/207 |
| 2003/0105551 | A1 | | 6/2003 | Hoe et al. |
| 2008/0142416 | A1 | | 6/2008 | Lawson et al. |
| 2018/0178396 | A1 | * | 6/2018 | Ochiishi ............. B25J 15/0061 |

FOREIGN PATENT DOCUMENTS

| | | | |
|---|---|---|---|
| JP | 2017-185592 A | | 10/2017 |
| JP | 2017185592 A | * | 10/2017 ............. B25J 15/08 |

* cited by examiner

HAND, ROBOT SYSTEM, AND WORKPIECE EXTRACTION METHOD

CROSS-REFERENCE TO RELATED APPLICATIONS

This application is a new U.S. Patent Application that claims benefit of Japanese Patent Application No. 2018-230029, dated Dec. 7, 2018, the disclosure of this application is being incorporated herein by reference in its entirety for all purposes.

BACKGROUND OF THE INVENTION

1. Field of the Invention

The present invention relates to a hand, a robot system including a robot equipped with the hand, and a workpiece extraction method using the hand.

2. Description of the Related Art

A device which is capable of automatically extracting workpieces one-by-one from a workpiece group in which thin, plate-like workpieces are stacked is desired. In connection therewith, Japanese Unexamined Patent Publication (Kokai) No. 2017-185592A describes a workpiece extraction device comprising gripping means which grip and extract an uppermost workpiece from a workpiece group in which hat-like workpieces including left and right flange surfaces are stacked in multiple stages. The gripping means comprises a fixed claw having two abutment surfaces which abut the upper surface side of the flange of the uppermost workpiece and the upper surface side of the flange of the workpiece in the subsequent stage, respectively, and a movable claw which abuts the lower surface side of the flange of the uppermost workpiece, wherein the flange of the uppermost workpiece is gripped by the fixed claw and the movable claw. Japanese Unexamined Patent Publication (Kokai) No. 04-182231A describes a separation device, wherein a pair of workpiece separation members each having a holding claw and a separation claw are moved so as to be brought close to each other and press a workpiece in the bottommost stage of a workpiece stack, and thereafter, the bottommost workpiece is drawn downwards, by lowering the separation claw, to separate it from the other workpieces.

SUMMARY OF THE INVENTION

In the case in which workpieces are extracted one-by-one from a stacked workpiece group using the gripping members of a robot hand, particularly when the workpieces are thin, sheet-like molded components, the workpieces tend to stick together or do not separate due to friction therebetween, whereby multiple workpieces are lifted at once. A hand, robot system, and workpiece extraction method with which workpieces can be reliably extracted one-by-one from a stacked workpiece group are therefore in demand.

An aspect of the present disclosure provides a hand comprising a plurality of first gripping members which move relative to each other, a first drive unit configured to move the plurality of first gripping members in a first opening and closing direction to bring the plurality of first gripping members close to each other or separate them from each other, a plurality of second gripping members which move relative to each other independently from the plurality of first gripping members, a second drive unit configured to move the plurality of second gripping members in a second opening and closing direction to bring the plurality of second gripping members close to each other or separate them from each other, and a third drive unit configured to move the plurality of first gripping members relative to the plurality of second gripping members in a third direction intersecting the first opening and closing direction and the second opening and closing direction.

Another aspect of the present disclosure provides a robot system comprising the hand described above, a robot equipped with the hand, and a controller which controls the robot and which controls the first drive unit, the second drive unit, and the third drive unit of the hand.

Yet another aspect of the present disclosure provides a method for extracting a target workpiece from a plurality of stacked workpieces using the hand described above, the method comprising: gripping a non-target workpiece stacked directly under the target workpiece with the plurality of second gripping members by controlling the second drive unit to bring the plurality of second gripping members close to each other; holding the target workpiece with the plurality of first gripping members by controlling the first drive unit to bring the plurality of first gripping members close to each other in a state in which the non-target workpiece is gripped by the plurality of second gripping members; separating the target workpiece from the non-target workpiece by controlling the third drive unit to separate the plurality of first gripping members, which hold the target workpiece, from the plurality of second gripping members which grip the non-target workpiece; and releasing the non-target workpiece from the plurality of second gripping members by controlling the second drive unit to separate the plurality of second gripping members in a state in which the target workpiece has been separated from the non-target workpiece.

BRIEF DESCRIPTION OF THE DRAWINGS

The object, features, and advantages of the present invention will be elucidated by the following description of the embodiments with reference to the attached drawings. In the attached drawings.

DETAILED DESCRIPTION

The embodiments of the present disclosure will be described below with reference to the attached drawings. In the drawings, corresponding constituent elements have been assigned common reference signs. In order to facilitate understanding, the scales of the drawings have been appropriately modified. Furthermore, the forms shown in the drawings are merely examples for carrying out the present invention, i.e. the present invention is not limited to the illustrated forms.

Figure 1:
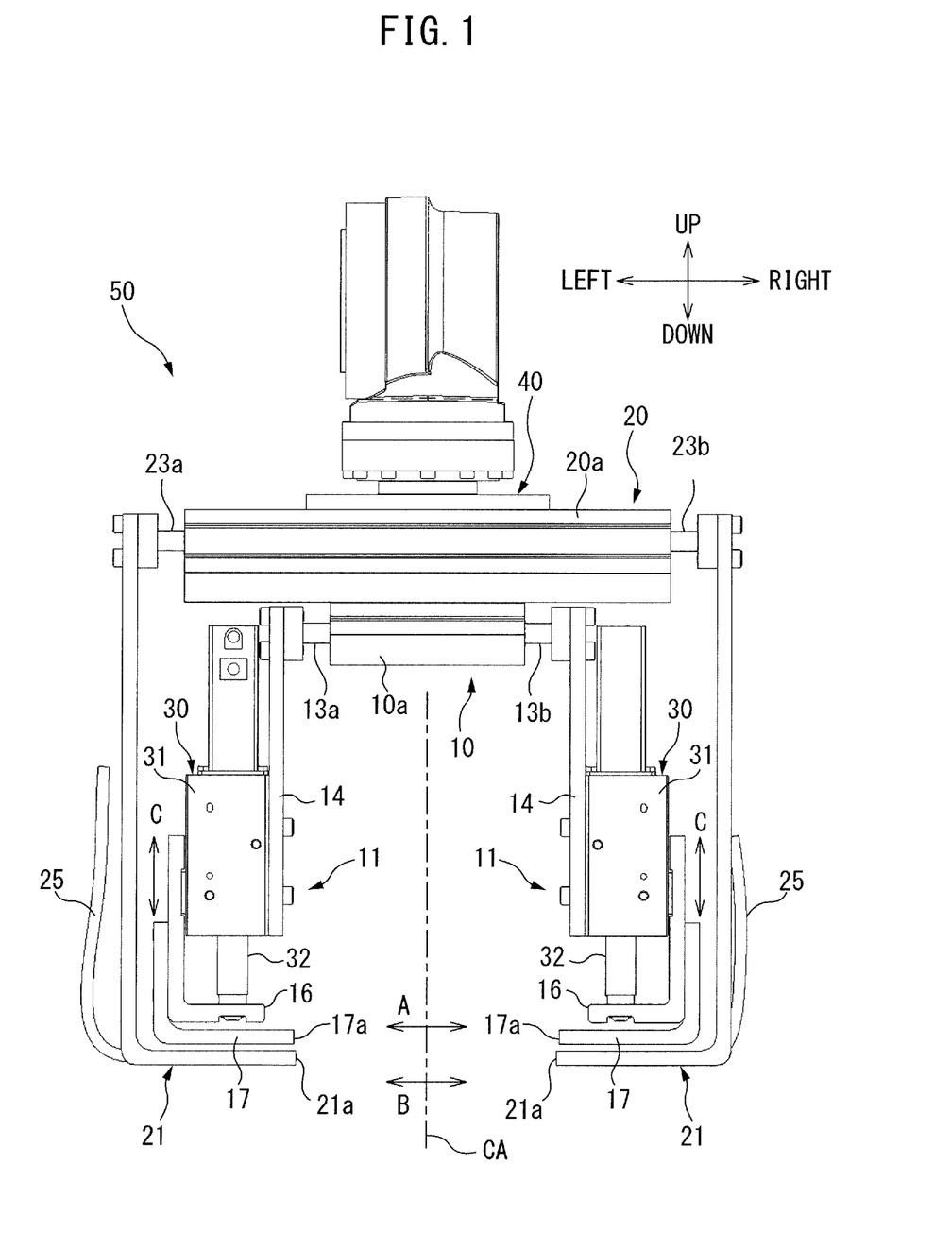
FIG. 1 is a front view of a hand according to an embodiment.
Figure 2:
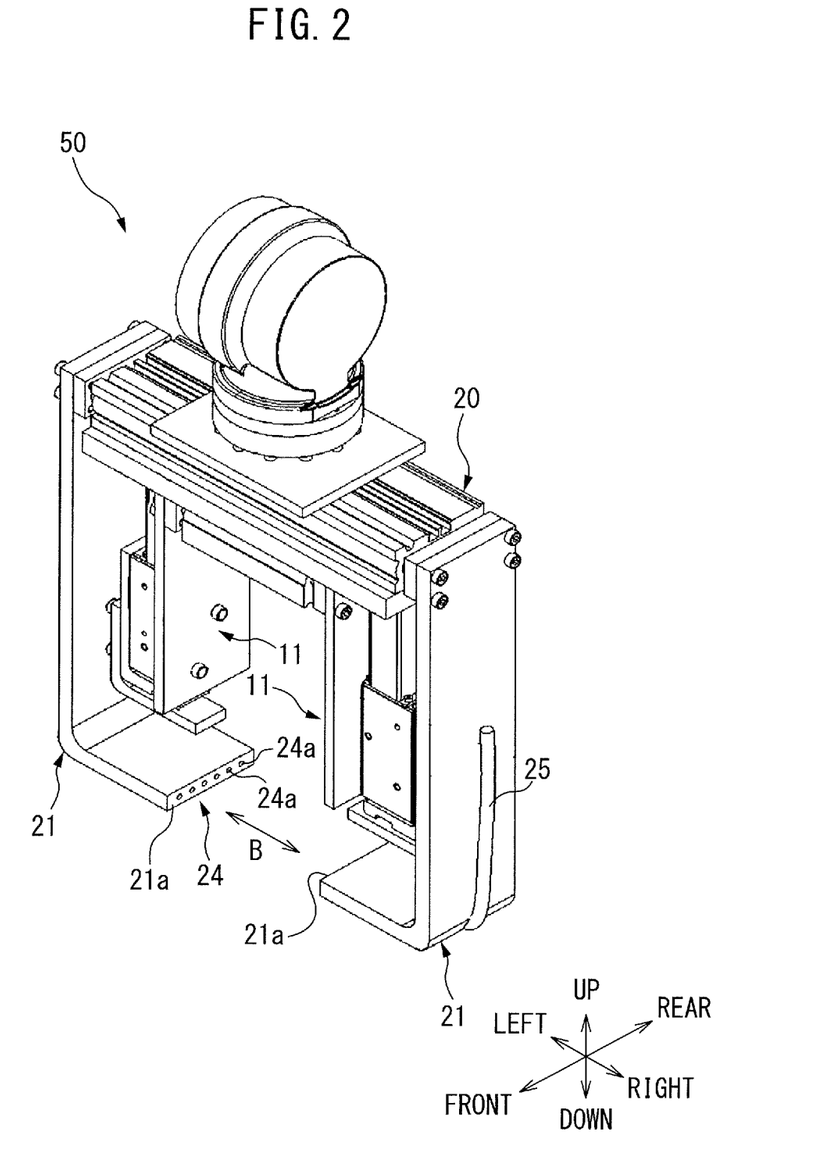
FIG. 2 is a perspective view of the hand.
Figure 3:
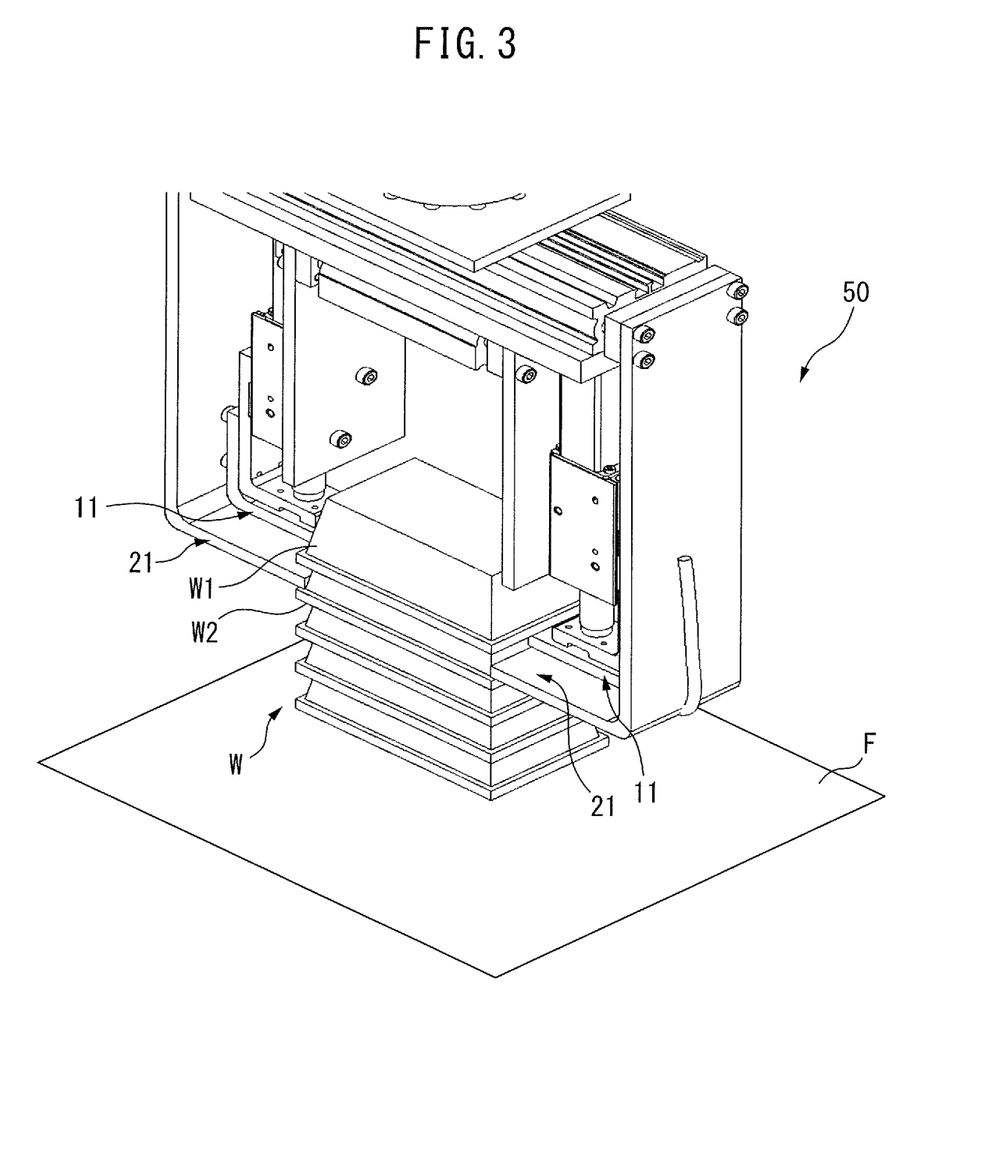
FIG. 3 is a perspective view showing a state in which the hand performs a workpiece extraction operation.

FIG. 1 is a front view of a hand 50 according to an embodiment, FIG. 2 is a perspective view of the hand 50, and FIG. 3 is a perspective view showing a state in which the hand 50 performs a workpiece extraction operation. The hand 50 separates and extracts an extraction target workpiece W1 from a workpiece group W of workpieces stacked on a workpiece placement surface F. Though the workpiece group W is, for example, a stack of dunnage constituted by the sheet-like molded products shown in FIG. 3, the workpiece group handled by the hand 50 may be of various types such as other types of sheet-like molded products, paper cups, wafers, thin metal plate members, etc.

As shown in FIGS. 1 to 3, the hand 50 comprises a plurality of first gripping members 11 which move relative to each other, a first drive unit 10 which moves the plurality of first gripping members 11 in a first opening and closing direction A to bring the plurality of first gripping members 11 close to each other or separate them from each other, a plurality of second gripping members 21 which move relative to each other independently from the plurality of first gripping members 11, a second drive unit 20 which moves the plurality of second gripping members 21 in a second opening and closing direction B to bring the plurality of second gripping members 21 close to each other or separate them from each other, and a third drive unit 30 which moves the plurality of first gripping members 11 relative to the plurality of second gripping members 21 in a third direction C intersecting the first opening and closing direction A and the second opening and closing direction B. Though a pair of first gripping members 11 are provided in the present embodiment, a configuration in which three or more first gripping members 11 are provided and the first gripping members 11 are brought close to or separated from each other may be adopted. Furthermore, though a pair of second gripping members 21 are provided in the present embodiment, a configuration in which three or more second gripping members 21 are provided and the second gripping members 21 are brought close to or separated from each other may be adopted. For ease of explanation below, the directions along the center axis CA (refer to FIG. 1) of the hand 50 are referred to as the upward and downward directions, and the left and right directions and forwards and rearwards directions are defined as shown in FIGS. 1 and 2.

The first drive unit 10 is, for example, a linear actuator using a servomotor, comprising a housing 10a enclosing the servomotor and a ball screw, and movable shafts 13a, 13b, and reciprocating the movable shafts 13a, 13b in the first opening and closing direction A relative to the housing 10a. The first gripping members 11 comprise first support members 14, second support members 16 which are connected to the first support members 14 so as to be movable in the upward and downward directions via third drive units 30, and gripping claws 17 fixed to the second support members 16. The first support members 14 are rectangular plate-like members one end of which is fixed to the movable shaft 13a (13b) of the first drive unit 10 and which extend downwardly. The third drive units 30 are, for example, linear actuators using servomotors, comprising housings 31 enclosing the servomotors and ball screws, and movable shafts 32, and reciprocate the movable shafts 32 in the third direction C relative to the housings 31. The housings 31 of the third drive units 30 are attached to the lower end sides of the first support members 14. The second support members 16 are rectangular plate-like members which are bent into an L-shape in a front view, and are attached, at the end parts of the lower sides thereof, to the tips of the movable shafts 32 of the third drive units 30. The gripping claws 17 are rectangular plate-like members which are bent into an L-shape in a front view, and the upper side portions thereof are fixed to the second support members 16. The tips 17a of the pair of gripping claws 17 face each other.

In the above structure, the first gripping members 11 are brought close to or separated from each other by the reciprocation of the movable shafts 13a, 13b in the first opening and closing direction A by the first drive unit 10. Furthermore, the first gripping members 11 (specifically, the gripping claws 17) are moved in the third direction C so as to be brought close to or separated from the second gripping members 21 by the reciprocation of the movable shafts 32 in the third direction C by the third drive units 30.

The second drive unit 20 is, for example, a linear actuator using a servomotor, comprising a housing 20a which encloses the servomotor and a ball screw, and movable shafts 23a, 23b, and reciprocates the movable shafts 23a, 23b in the second opening and closing direction B relative to the housing 20a. The second gripping members 21 are rectangular plate-like members which are bent in an L-shape in a front view, the upper ends thereof are connected with the movable shaft 23a (23b) of the second drive unit 20, and the tips 21a of the lower ends thereof face each other. In this configuration, the pair of second gripping members 21 are moved so as to be brought close to or separated from each other by reciprocation of the movable shafts 23a, 23b in the second opening and closing direction B by the second drive unit 20.

A connection part 40 for connection with a movable body such as a robot is arranged on the housing 20a of the second drive unit 20, and the housing 20a constitutes the base of the hand 50. The housing 10a of the first drive unit 10 is fixed to the housing 20a of the second drive unit 20.

With the hand 50 configured in this manner, the extraction target workpiece W1 can be separated and extracted, by gripping, with the second gripping members 21, a workpiece W2 directly below the workpiece W1 in the workpiece group W, which are stacked in the upward and downward directions, and by lifting, with the first gripping members 11, the peripheral part of the lower end of the workpiece W1 from the lower side thereof, as shown as an example in FIG. 3.

As shown in FIG. 2, the second gripping members 21 may include air discharge parts 24 constituted by a plurality of air discharge holes 24a in the tips 21a. In the air discharge parts 24, compressed air is supplied from an external compressed air supply unit (not illustrated) via tubes 25, and the compressed air is discharged from the air discharge holes 25a in the second opening and closing direction B. According to this structure, in the state shown in, for example, FIG. 3, air can be blown between the workpiece W2 and the workpiece W1 by discharging compressed air from the air discharge parts 24, whereby separation of the workpiece W2 from the workpiece W1 can be promoted. It should be noted that the air discharge parts 24 may be configured so as to discharge compressed air upwardly toward the workpiece W1 side. Air discharge parts may be provided in the first gripping members 11.

Figure 4:
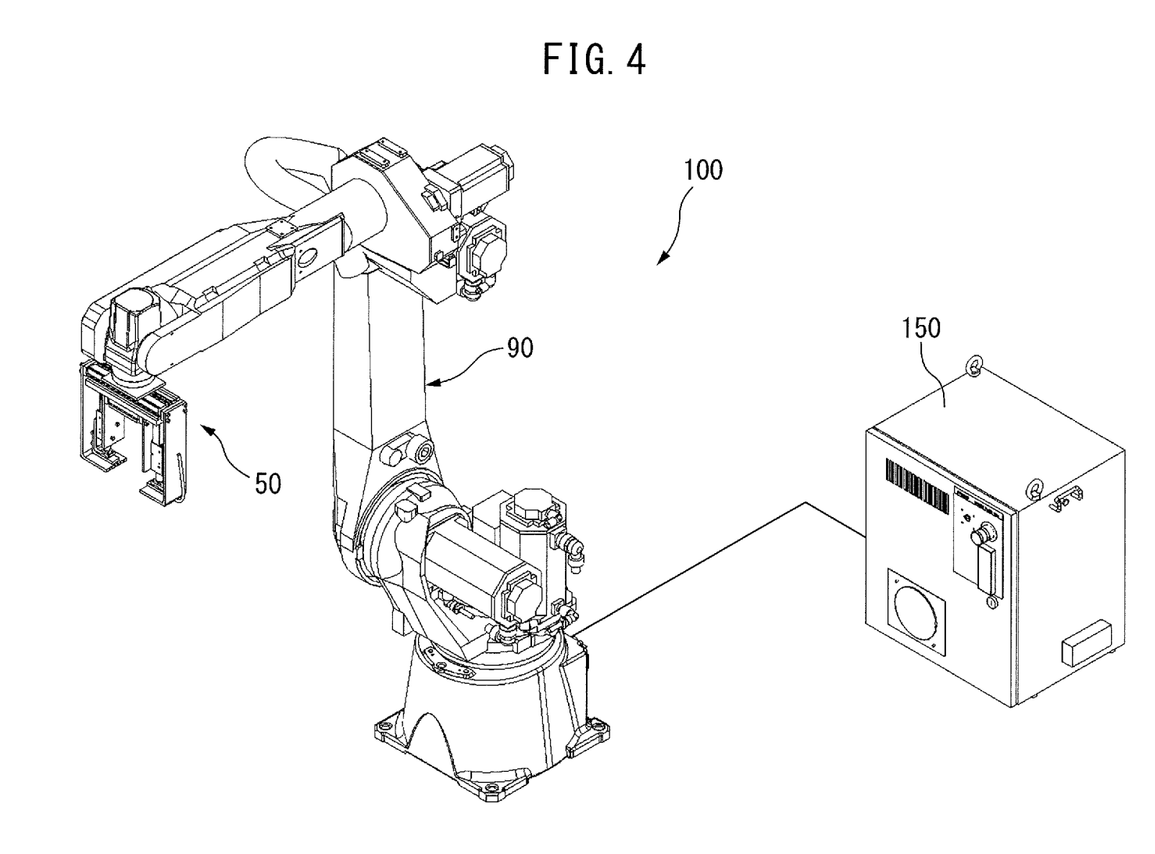
FIG. 4 is a view showing the structure of a robot system comprising the hand, a robot equipped with the hand, and a controller.
Figure 5:
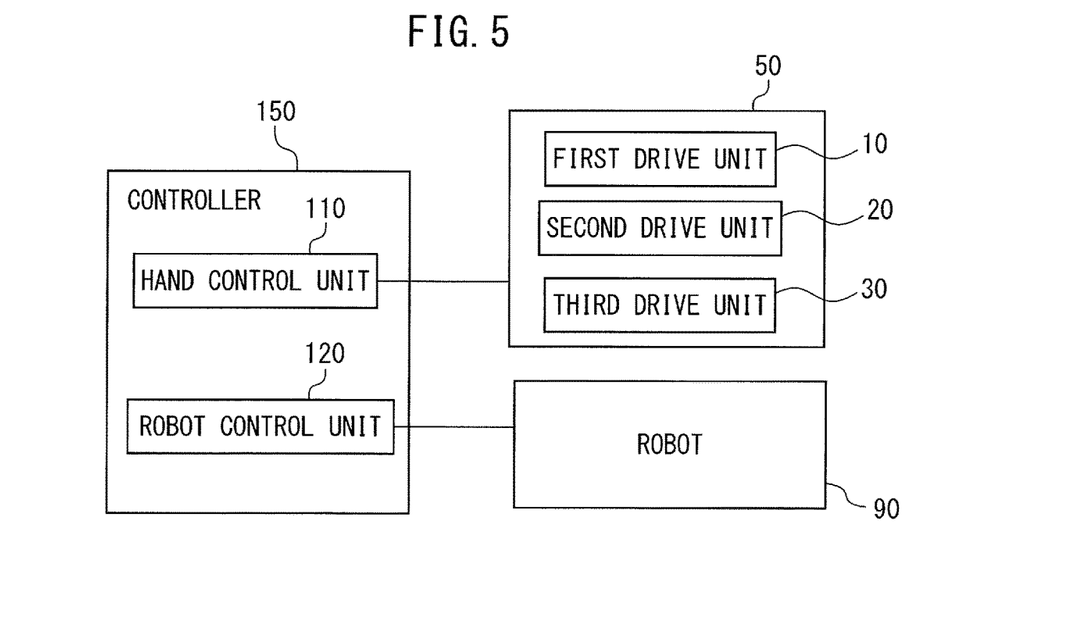
FIG. 5 is a functional block diagram of the robot system.

FIG. 4 is a view showing the structure of a robot system 100 comprising the hand 50, a robot 90 equipped with the hand 50 on the tip of an arm thereof, and a controller 150. FIG. 5 is a functional block diagram of the robot system 100. As shown in FIG. 5, the controller 150 comprises a hand control unit 110 which controls the first drive unit 10, the second drive unit 20, and the third drive units 30 of the hand 50, and a robot control unit 120 which controls the movements of the robot 90. The controller 150 may be structured as a conventional computer including a CPU, ROM, RAM, a storage device, and an operation unit, etc.

Figure 6:
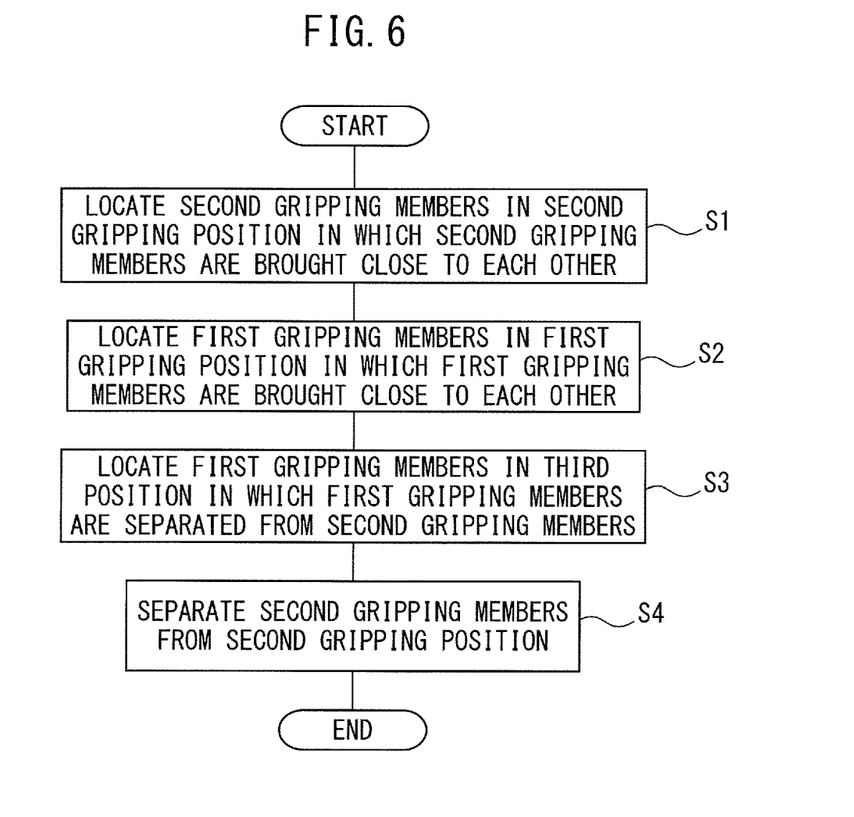
FIG. 6 is a flowchart showing the workpiece extraction operation executed by the robot system.
Figure 7:
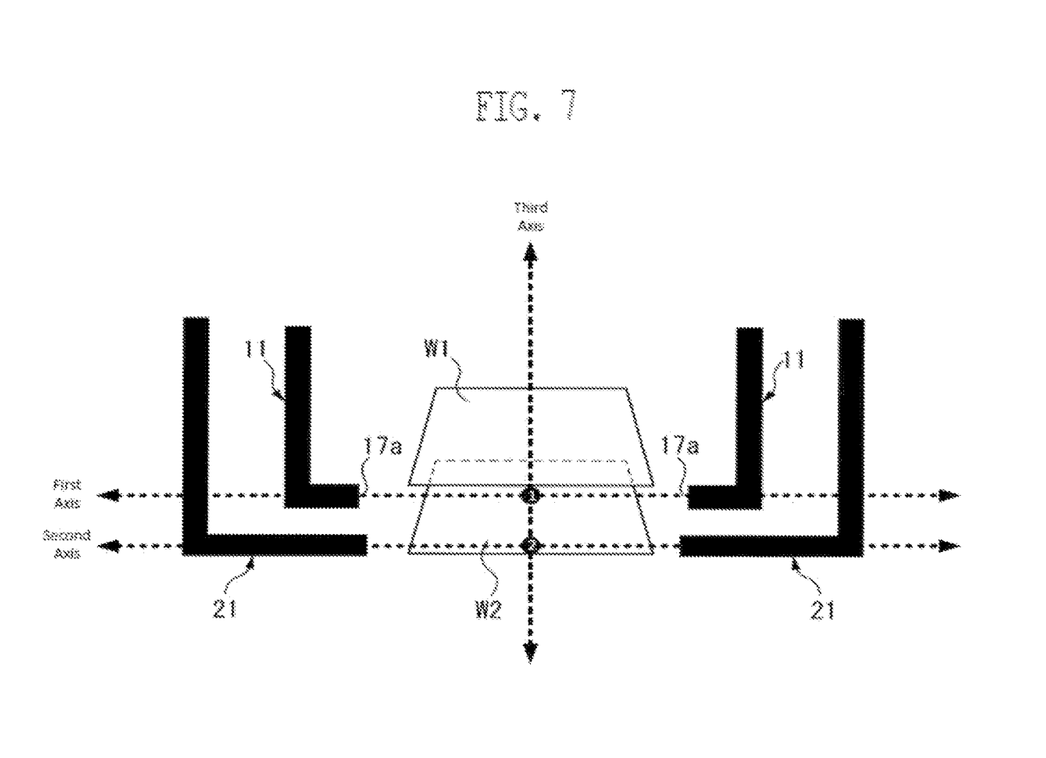
FIG. 7 is a schematic diagram showing first gripping members and second gripping members in an initial state.
Figure 8:
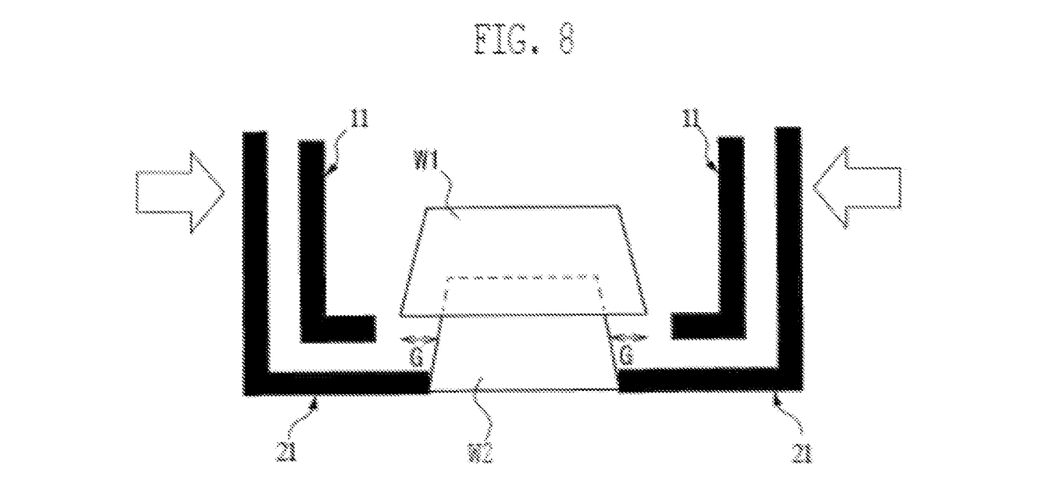
FIG. 8 is a schematic diagram showing a state in which the second gripping members have been positioned in a second gripping position from the state of FIG. 7.
Figure 12:
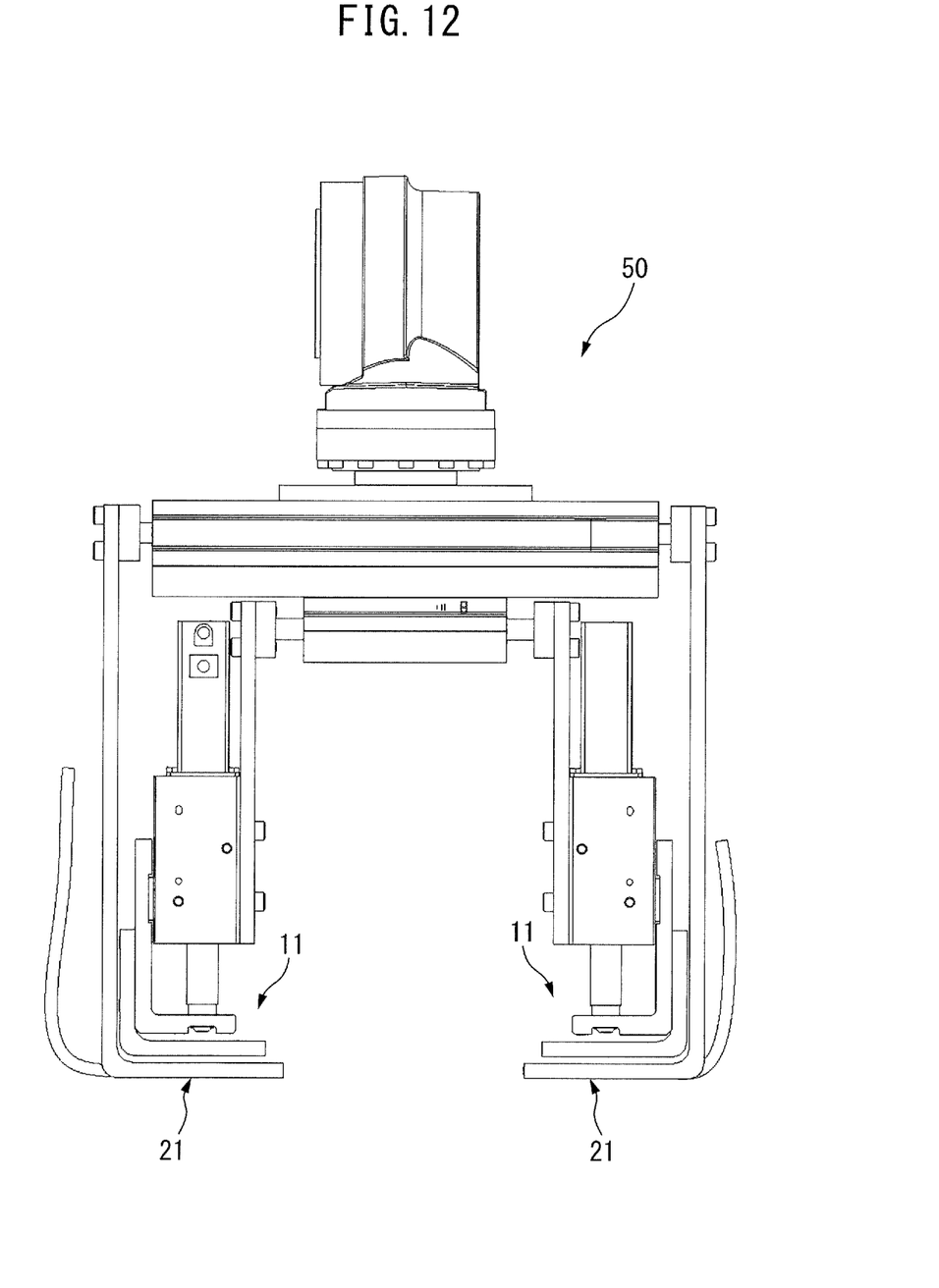
FIG. 12 is a front view of the hand corresponding to the state of FIG. 8.

FIG. 6 is a flowchart showing the workpiece extraction operation executed by the robot system 100. The workpiece extraction operation is executed under control of the controller 150. FIGS. 7 to 11 are views schematically showing the movements of the first gripping members 11 and the second gripping members 21 when the hand 50 moves in accordance with the flow of FIG. 6. The uppermost stage workpiece W1 is the extension target workpiece, and the workpiece W2 directly therebelow is a workpiece other than the extraction target. As preparation for executing the workpiece extraction operation, the controller 150 moves the robot 90 to position the first gripping members 11 and the second gripping members 21 in an initial state in which the tips 17a of the first gripping members 11 face the vicinity of the lower end of the side surfaces of the workpiece W1, and the tips 21a of the second gripping members 21 face the side surfaces of the workpiece W2, with respect to a first axis, a second axis, a third axis, a first intersection point 1 and a second intersection point 2 as shown in FIG. 7. First, in step S1, the controller 150 brings the second gripping members 21 close to each other and positions the second gripping members 21 in the second gripping position shown in FIG. 8 by controlling the second drive unit 20. The second gripping members 21 in the second gripping position are in a state in which the side surfaces of the workpiece W2 are pressed and gripped inwardly from the left and right sides by the second gripping members. FIG. 12 is a front view of the hand 50 in a state in which the second gripping members 21 are in the second gripping position as a result of the process of step S1. It should be noted that in FIG. 12 (and FIGS. 13 to 15), the workpiece W is omitted.

Figure 9:
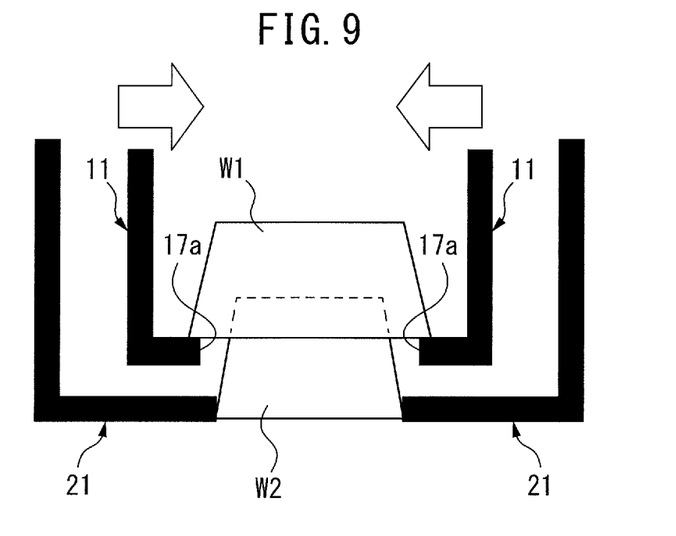
FIG. 9 is a schematic diagram showing a state in which the first gripping members have been positioned in a first gripping position from the state of FIG. 8.
Figure 10:
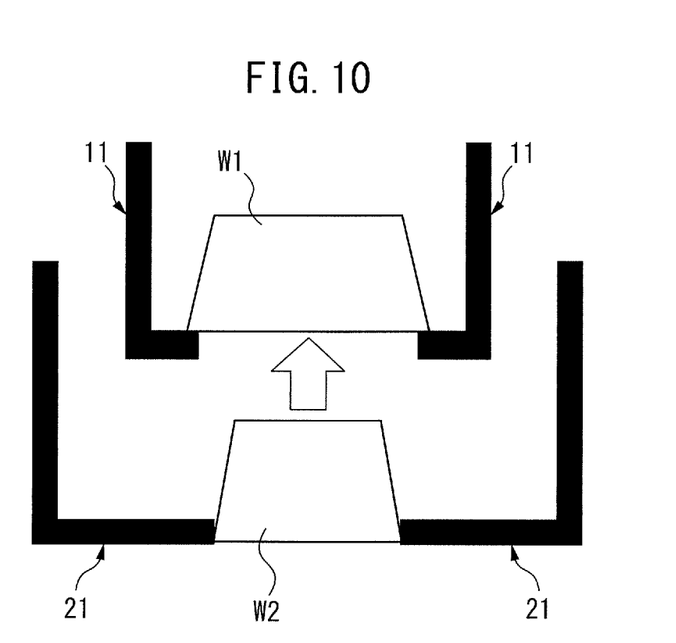
FIG. 10 is a schematic diagram showing a state in which the first gripping members have been raised and positioned in a third position from the state of FIG. 9.
Figure 13:
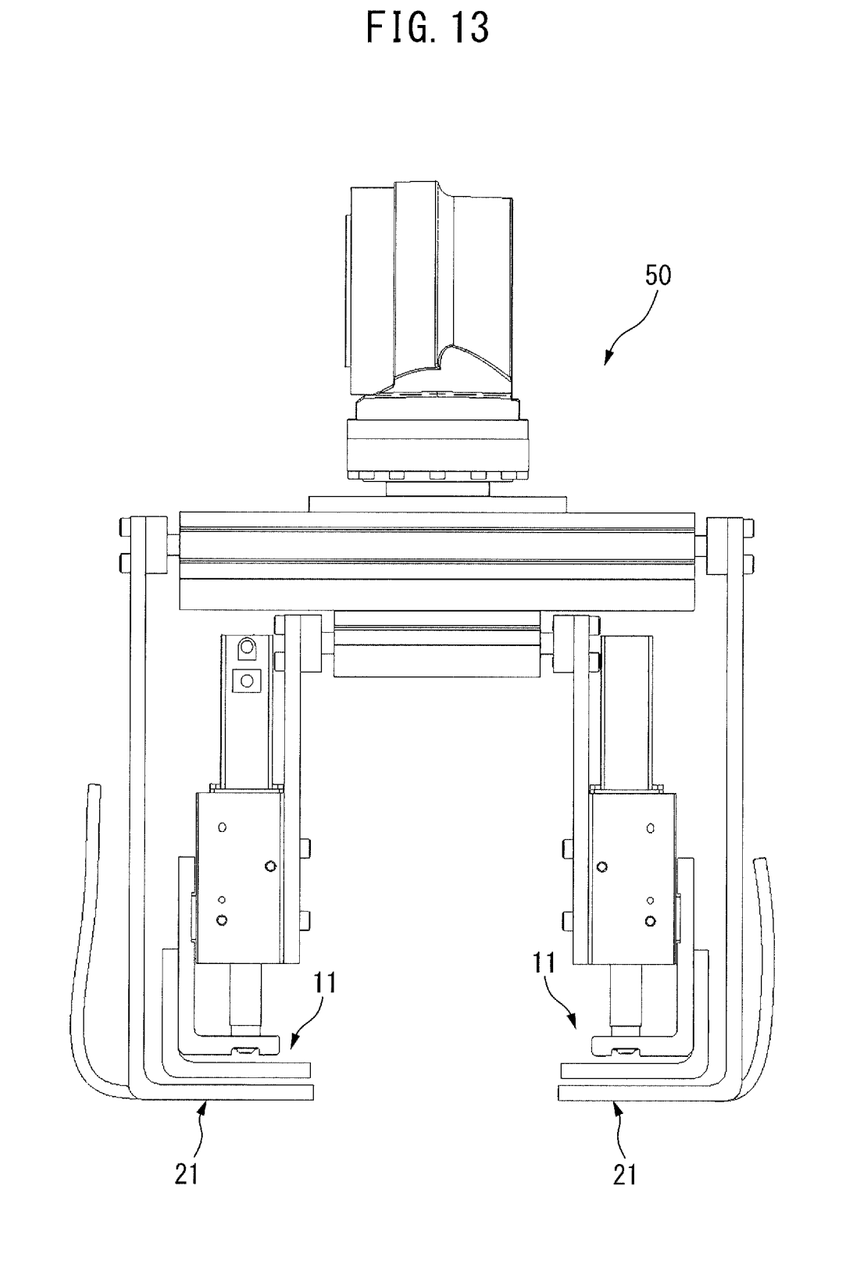
FIG. 13 is a front view of the hand corresponding to the state of FIG. 9.
Figure 14:
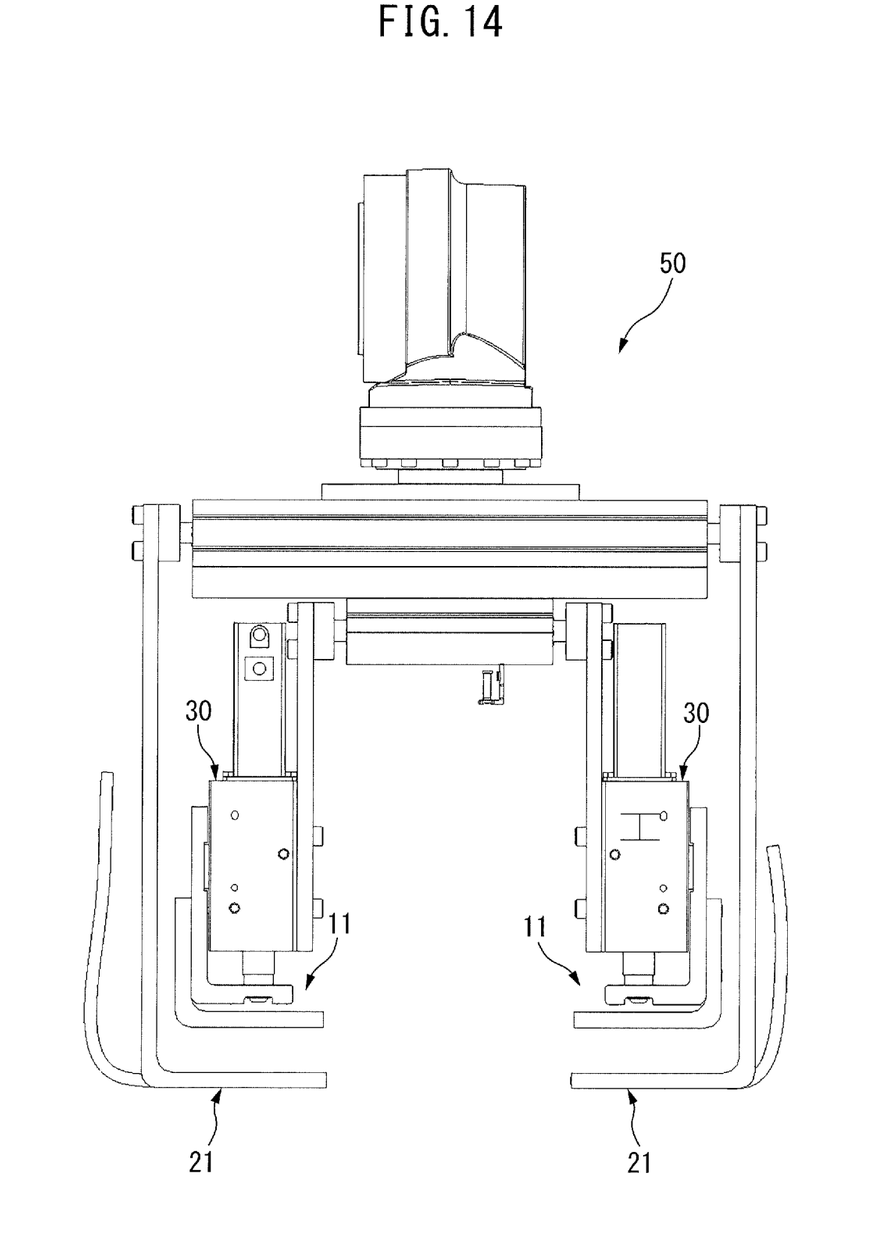
FIG. 14 is a front view of the hand corresponding to the state of FIG. 10.

Next, the controller 150, in a state in which the second gripping members are in the second gripping position, brings the first gripping members 11 close to each other and positions the first gripping members 11 in the first gripping position shown in FIG. 9 by controlling the first drive unit 10 (step S2). In this state, the tips 17a of the gripping claws 17 of the first gripping members 11 enter below the workpiece W1. FIG. 13 is a front view of the hand 50 in a state in which the first gripping members 11 are positioned in the first gripping position as a result of the process of step S2. Next, the controller 150 separates the first gripping members 11 from the second gripping members 21 and positions the first gripping members 11 in the third position shown in FIG. 10 by controlling the third drive units 30 (step S3). FIG. 14 is a front view of the hand 50 in a state in which the first gripping members 11 are in the third position as a result of the process of step S3. As a result, the workpiece W1 is lifted and separated from the workpiece W2.

Figure 11:
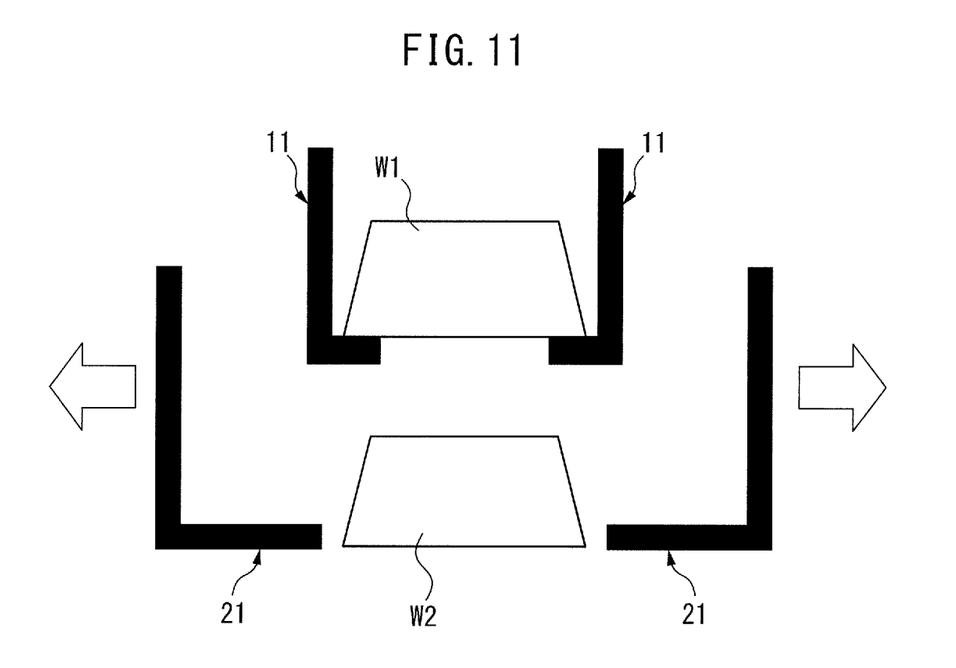
FIG. 11 is a schematic diagram showing a state in which the second gripping members are separated from each other from the state of FIG. 10.
Figure 15:
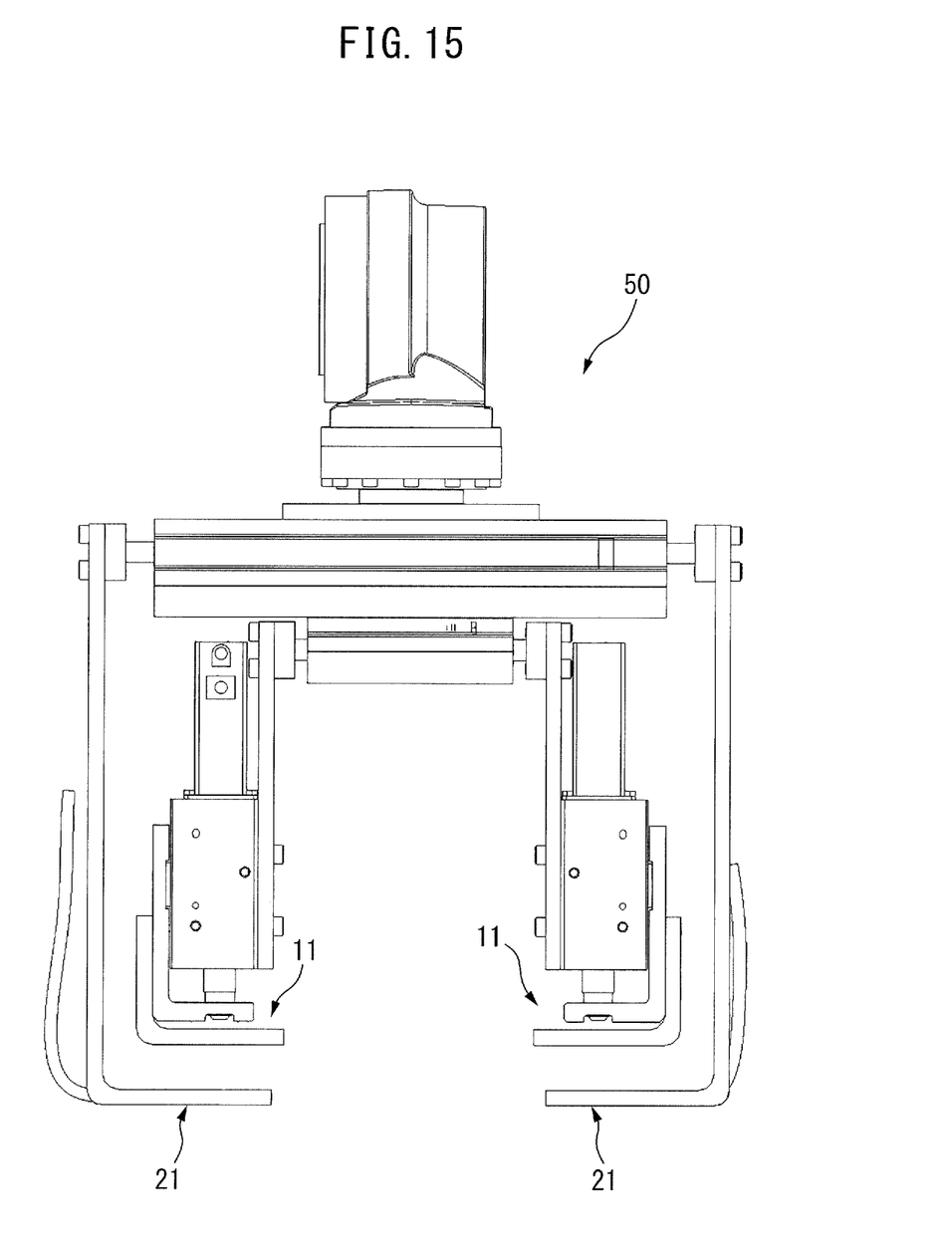
FIG. 15 is a front view of the hand corresponding to the state of FIG. 11.

Next, the controller 150, in a state in which the first gripping members 11 are positioned in the third position, separates the second gripping members 21 from the second gripping position as shown in FIG. 11 by controlling the second drive unit 20 (step S4). As a result, the workpiece W2 is released form the second gripping members 21. FIG. 15 is a front view of the hand 50 in a state in which the second gripping members 21 are separated from one another as a result of the process of step S4. In this state, the controller 150 transports the workpiece W2 to the destination by moving the robot 90.

According to the work extraction operation described above, since the workpiece W2 directly below the uppermost stage workpiece W1 is gripped by the second gripping members 21 and the workpiece W1 is held and lifted, the uppermost stage workpiece W1 can be reliably separated and extracted from the workpiece W2. It should be noted that the number of workpieces held and lifted by the first gripping members 11 may be two or more, and two or more workpieces may be extracted.

Note that in step S1 described above, if the workpiece W2 is deformed, so as to form a gap G between the workpiece W2 and the workpiece W1 when the workpiece W2 is gripped by the second gripping members 21 (refer to FIG. 8), it is easier to separate the workpiece W1 from the workpiece W2. Furthermore, in the case in which the second gripping members 21 include air discharge parts 24, when the second gripping members 21 grip the workpiece W2 and a gap G is formed between the workpiece W1 and the workpiece W2, compressed air may be blown from the air discharge parts 24 into the gap G. In this case, separation of the workpiece W2 and the workpiece W1 can be further promoted.

According to the present embodiment described above, workpieces can reliably be extracted one-by-one from a stacked workpiece group.

Notwithstanding the embodiments of the present disclosure have been described above, a person skilled in the art would understand that various modifications and changes can be made without deviating from the scope disclosed in the claims described later.

Though both the first gripping members 11 are configured so as to move in the embodiments described above, a configuration in which one of the pair of first gripping members 11 is fixed and the other moves may be adopted. Regarding the pair of second gripping members 21 as well, a configuration in which one of the pair of second gripping members 21 is fixed and the other moves may be adopted. In the case of such a configuration, the same workpiece gripping function as in the embodiments described above can be achieved. Note that when a configuration in which three or more gripping members (a plurality of first gripping members or a plurality of second gripping members) is adopted, it is sufficient that at least one of the gripping members be provided so as to be movable.

Though the first opening and closing direction A and the second opening and closing direction B are parallel in the embodiments described above, a configuration in which, for example, the first gripping members 11 are located in a position rotated about the center line CA, and the first opening and closing direction A and the second opening and closing direction B intersect in the same plane (e.g., the first opening and closing direction A is the frontward and rearward directions, and the second opening and closing direction B is the leftward and rightward direction) can be adopted. Though the third direction C in which the third drive unit 30 moves the first gripping members 11 is the vertical direction and is perpendicular to the first opening and closing direction A and the second opening and closing direction B in the embodiments described above, this is merely exemplary, and the present invention is not limited to such a configuration.

In the embodiments described above, though the first gripping members 11 and the second gripping members 21 are opened and closed by linear reciprocating motion, a configuration in which the first gripping members 11 and the second gripping members 21 are opened and closed along an arcuate movement trajectory may be adopted.

Also, the first gripping members 11 may include suction cups for drawing the workpiece by suction.

The invention claimed is:
1. A hand, comprising:
a plurality of first gripping members which move relative to each other,
a first drive unit configured to move the plurality of first gripping members in a first opening and closing direction along a first axis to bring the plurality of first gripping members close to each other in a first closed position or separate them from each other in a first opened position,
a plurality of second gripping members which move relative to each other independently from the plurality of first gripping members,
a second drive unit configured to move the plurality of second gripping members in a second opening and closing direction along a second axis to bring the plurality of second gripping members close to each other in a second closed position or separate them from each other in a second opened position, and
a third drive unit configured to move the plurality of first gripping members relative to the plurality of second gripping members in a third direction along a third axis, the third axis intersecting the first axis at a first intersection point and intersecting the second axis at a second intersection point,
wherein each of the plurality of first gripping members includes:
a first member having one end part fixed to a movable part of the first drive unit, a housing of the third drive unit being attached to the first member, and
a second member connected to the first member via the third drive unit,
wherein the second member has one end part fixed to a movable part of the third drive unit so as to be movable in the third direction relative to the first member,
wherein the plurality of first gripping members are positioned above the plurality of second gripping members along the third axis, and are physically obstructed by the second gripping members from reaching the second intersection point when the second member of each of the plurality of first gripping members is moved by the third drive unit along the third axis and the second gripping members in the second closed position along the second axis.

2. The hand according to claim 1, wherein the first opening and closing direction and the second opening and closing direction are parallel to each other.

3. The hand according to claim 1, wherein the third direction is orthogonal to both the first opening and closing direction and the second opening and closing direction.

4. The hand according to claim 1, further comprising a gas discharge part provided in at least one of the plurality of second gripping members.

5. The hand according to claim 4, wherein the gas discharge part discharges compressed air in a direction along the second opening and closing direction.

6. A robot system, comprising:
the hand according to claim 1,
a robot equipped with the hand, and
a controller which controls the robot, and which controls the first drive unit, the second drive unit, and the third drive unit of the hand.

7. The robot system according to claim 6, wherein the controller:
controls the second drive unit to locate the plurality of second gripping members in a second gripping position in which the plurality of second gripping members are brought close to each other,
controls the first drive unit, in a state in which the plurality of second gripping members are located in the second gripping position, to locate the plurality of first gripping members in a first gripping position in which the plurality of first gripping members are brought close to each other,
controls the third drive unit to locate the plurality of first gripping members, which are located in the first gripping position, in a third position separated from the plurality of second gripping members which are located in the second gripping position, and
controls the second drive unit, in a state in which the plurality of first gripping members are located in the third position, to separate the plurality of second gripping members from the second gripping position.

8. A method for extracting a target workpiece from a plurality of stacked workpieces using the hand according to claim 1, the method comprising:
gripping a non-target workpiece stacked directly under the target workpiece with the plurality of second gripping members by controlling the second drive unit to bring the plurality of second gripping members close to each other;
holding the target workpiece with the plurality of first gripping members by controlling the first drive unit to bring the plurality of first gripping members close to each other in a state in which the non-target workpiece is gripped by the plurality of second gripping members;
separating the target workpiece from the non-target workpiece by controlling the third drive unit to separate the plurality of first gripping members, which hold the target workpiece, from the plurality of second gripping members which grip the non-target workpiece; and
releasing the non-target workpiece from the plurality of second gripping members by controlling the second drive unit to separate the plurality of second gripping members in a state in which the target workpiece has been separated from the non-target workpiece.

9. The method according to claim 8, wherein the non-target workpiece is deformed by gripping the non-target workpiece with the plurality of second gripping members to form a gap between the non-target workpiece and the target workpiece.

10. The method according to claim 9, wherein compressed air is blown into the gap when the target workpiece is separated from the non-target workpiece.

\* \* \* \* \*